United States Patent [19]

Fujii et al.

[11] Patent Number: 4,520,057
[45] Date of Patent: May 28, 1985

[54] COMPOSITE PLATE

[75] Inventors: Hideichi Fujii, Kobe; Chiyoki Yamane; Fumio Kawai, both of Osaka, all of Japan

[73] Assignees: Kawasaki Jukogyo Kabushiki Kaisha, Hyogo; Koshii & Co., Ltd., Osaka, both of Japan

[21] Appl. No.: 564,414

[22] Filed: Dec. 22, 1983

[30] Foreign Application Priority Data

Dec. 28, 1982 [JP] Japan .............................. 57-234435

[51] Int. Cl.³ .......................... B32B 1/04; B32B 3/02; B32B 15/10
[52] U.S. Cl. ......................................... 428/68; 428/76; 428/81; 428/157; 428/177; 428/192; 428/464; 428/920
[58] Field of Search ..................... 428/464, 68, 75, 76, 428/81, 83, 124, 127–130, 157, 177, 192, 920

[56] References Cited

U.S. PATENT DOCUMENTS

| 648,632 | 5/1900 | Parker | 428/75 |
| 1,575,842 | 3/1926 | Johnston | 428/157 |
| 2,011,130 | 8/1935 | Ward | 428/464 |
| 2,042,721 | 5/1935 | Loewy | 428/464 |

FOREIGN PATENT DOCUMENTS

| 2414402 | 9/1979 | France | 428/75 |
| 763412 | 12/1956 | United Kingdom | 428/75 |

Primary Examiner—William J. Van Balen

[57] ABSTRACT

A composite plate including a core plate, and top surface and bottom surface metallic plates which are folded to enclose the core plate to provide an airtight seal to the core plate. The composite plate has particular utility for use as a structural plate, such as floor plate, ceiling plate, etc.

4 Claims, 19 Drawing Figures

COMPOSITE PLATE

BACKGROUND OF THE INVENTION

This invention relates to a composite plate suitable for use as a structural plate, such as a floor plate, a wall plate, a ceiling plate, etc., of vehicles of subways and other means of transportation.

Heretofore, it has been usual practice to render plywood plates difficult to burn by impregnating them with a flame-proof agent. However, even if an attemt was made to render the plywood plates difficult to burn by impregnating them with a flame-proof agent, it has been difficult to achieve excellent results. Although it is possible to suppress flame formation in the event of a fire by using flame-proof plywood plates, it has been impossible to prevent smoke generation which is an important problem to be obviated in case of a fire. Meanwhile, attempts have been made to provide fire-proof plywood plates by attaching a stainless steel plate or an aluminum plate to each of top and bottom surface of an ordinary plywood or fire-proof plywood base plate. This type of fire-proof composite plate has had the disadvantage that, since material of the plywood base plate is exposed on all four sides, the plywood base plate might catch fire at its sides, making it impossible to render it completely fire-proof. An additional problem raised with regard to this type of fire-proof composite plate is that the plywood base plate might become damp due to the invasion of moisture through its exposed sides, causing corrosion to take place in the material or impairing dimensional stability of the plywood base plate.

SUMMARY OF THE INVENTION

This invention has been developed for the purpose of obviating the aforesaid problem of the prior art. Accordingly, the invention has as its object the provision of a composite plate in which the wooden core plate is rendered flame-proof, free from smoke generation and damp-proof, thereby making the composite plate perfectly fire-proof and corrosion-proof.

The aforesaid object is accomplished according to the invention by enclosing the wooden core plate by metallic plates at its top and bottom surface and all four sides and the metallic plates used for enclosing the wooden base plate are folded together in interlocking relation at their end portions to provide an airtight seal to the core plate.

By means of structural features provided by the invention, the wooden core plate is perfectly sealed by the metallic plates and shut off from the atmosphere, so that the wooden core plate is prevented from burning and becoming damp. This is conducive to prevention of expansion and corrosion of the wooden core plate. Moreover, since the core plate is made of wood, it functions as a shock-absorbing member and a thermal insulating member, and it is light in weight and able to be formed in any thickness as desired. Use of the metallic plates for enclosing the wooden core plate increases wear resistance and strength of the composite plate.

DESCRIPTION OF THE PREFERRED EMBODIMENTS

FIGS. 1–8 show a first embodiment of the invention.

Figure 1:
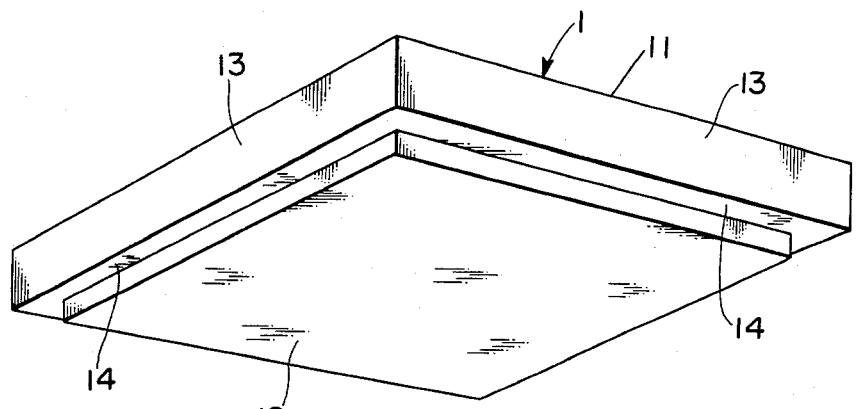
FIG. 1 is a perspective view of the core member of the composite plate comprising a first embodiment of the invention.

FIG. 1 is a perspective view of a core plate 1. The core plate 1 which is formed of plywood includes a flat top surface 11, a bottom surface 12, four side surfaces 13 and a stepped portion 14 interposed between the bottom surface 12 and the four side surfaces 13. The stepped portion 14 has a predetermined width and a predetermined distance between its surface and the bottom surface 12. The stepped portion 14 is provided for the purpose of imparting flatness to the bottom surface of the composite plate.

Figure 2:
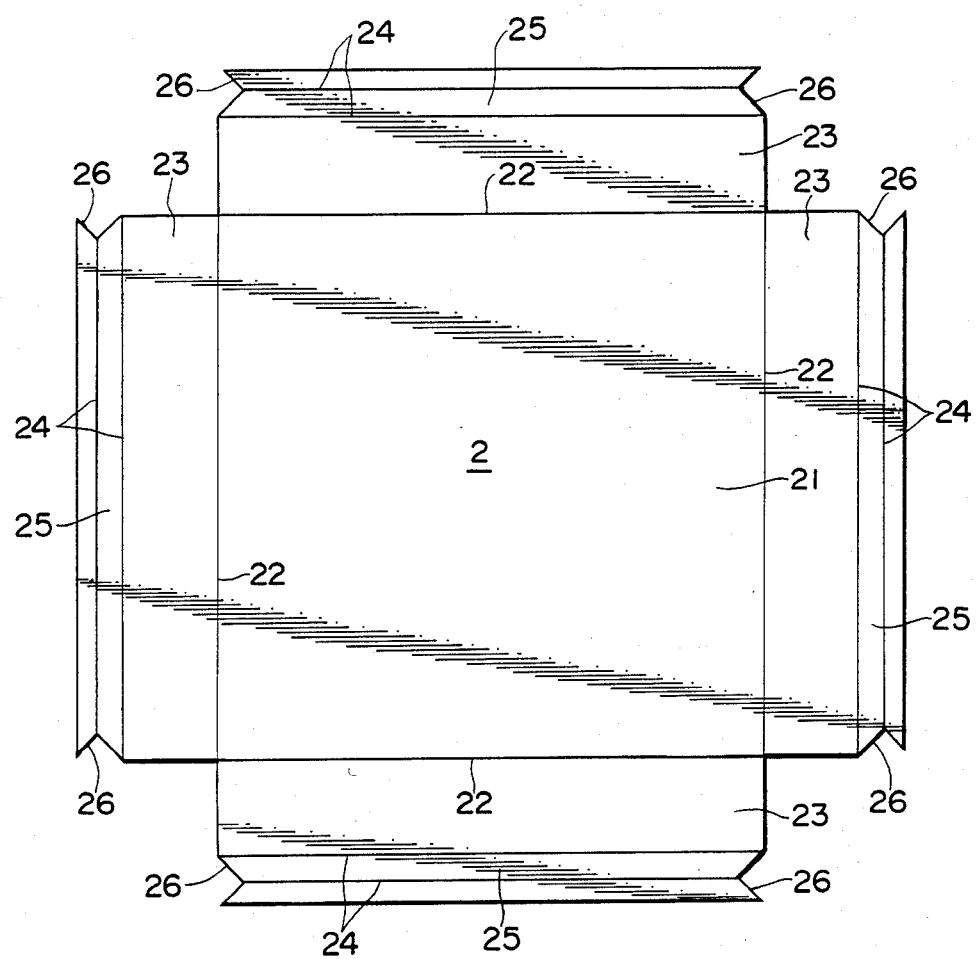
FIG. 2 is a developed view of the top surface metallic plate of the composite plate comprising the first embodiment.

FIG. 2 is a developed view of a top surface metallic plate 2. The top surface metallic plate 2 which is formed of stainless steel integrally includes a surface portion 21 for covering the top surface 11 of the core plate 1, peripheral surface portions 23 contiguous with the surface portion 21 through folds 22 for covering the respective side surfaces 13 of the core metal 1, and joint portions 25 contiguous with the respective peripheral surface portions 23 through folds 24. The joint portions 25 each have opposite side edges 26 which are cut substantially in the form of a letter V having its open end facing outwardly to avoid mutual interference when a joint is formed.

Figure 3:
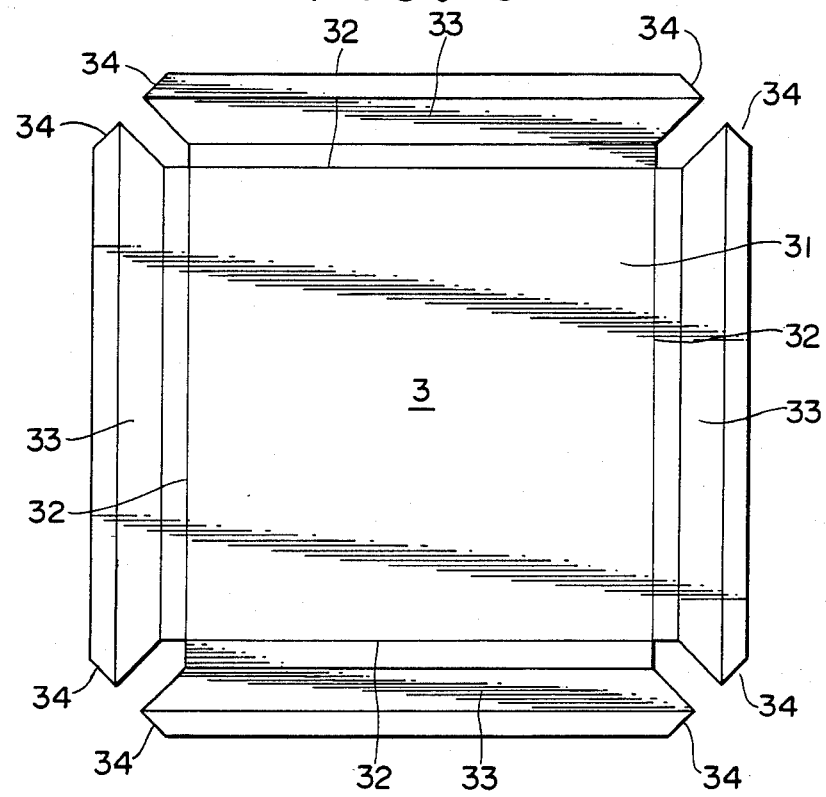
FIG. 3 is a developed view of the bottom surface metallic plate of the composite plate comprising the first embodiment.

FIG. 3 is a developed view of a bottom surface metallic plate 3. The bottom surface metallic plate 3 which is formed of stainless steel integrally includes a surface portion 31 for covering the bottom surface 12 of the core plate 1, and joint portions 33 contiguous with the surface portion 31 through folds 32. The joint portions 33 each have opposite side edges 34 which are cut substantially in the form of a letter V having its closed end facing outwardly in complementing relation to the joint portions 25 of the top surface metallic plate 2.

FIGS. 4–8 show the process of producing the composite plate comprising a first embodiment of the invention. The production process will first be described.

Figure 4:
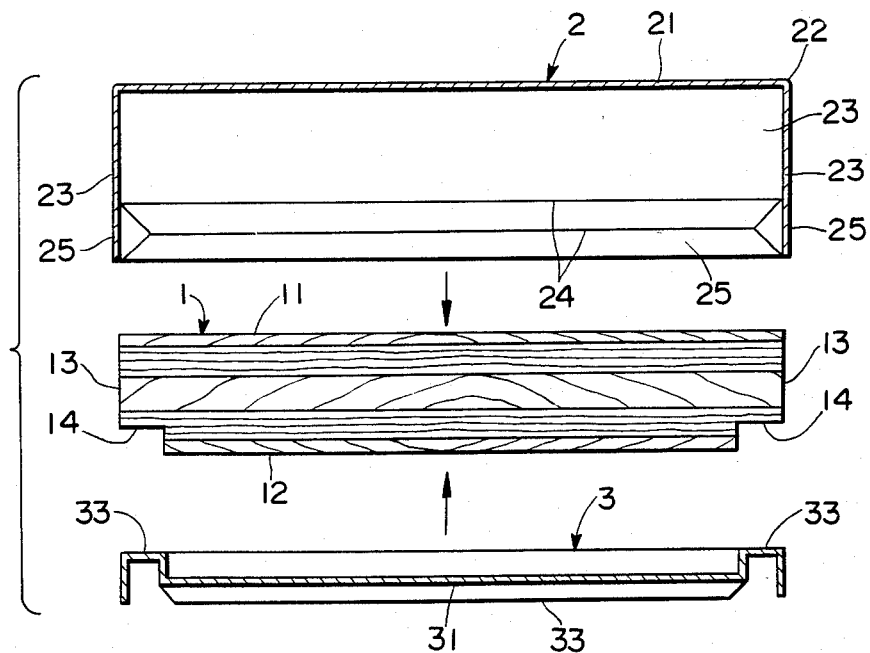
FIG. 4 is a sectional view of the wooden core plate and the top surface and bottom surface metallic plates of the composite plate comprising the second embodiment, before the wooden core plate is enclosed by the two metallic plates.

Referring to FIG. 4, the peripheral surface portions 23 of the top surface metallic plate 2 are each bent downwardly at a right angle to the surface portion 21, to form the top surface metallic plate 2 into a box shape. Meanwhile, the joint portions 33 of the bottom surface metallic plate 3 contiguous with the surface portion 31 are each bent several times substantially into the form of an inverted letter U with its horizontal portion being adapted to come into intimate contact with the respective stepped portion 14 of the core plate 1.

Figure 5:
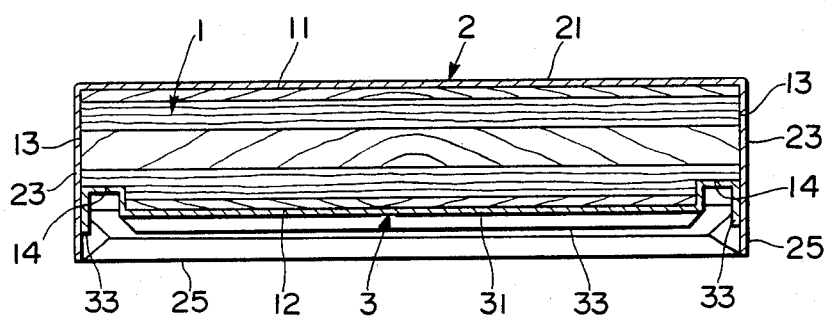
FIG. 5 is a sectional view of the composite plate comprising the first embodiment, showing the wooden core plate enclosed by the two metallic plates.

Referring to FIG. 5, the top surface metallic plate 2 formed into a box shape is fitted over the core plate 1 so that the surface portion 21 and the peripheral surface portions 23 cover the top surface 11 and the side surfaces 13 respectively of the core plate 1. Then, the joint portions 33 of the bottom surface metallic plate 3 each having portions in the form of an inverted letter U at the four sides of the metallic plate 3 are fitted to the respective stepped portions 14 formed on the bottom surface 12 of the core plate 1, to bring the surface portion 31 of the bottom surface metallic plate 3 into contact with the bottom surface 12 of the core plate 1 to cover the bottom surface 12 with the surface portion 31 of the bottom surface metallic plate 3. In this case, the surface portion 21 and peripheral surface portions 23 of the top surface metallic plate 2 and the surface portion 31 of the bottom surface metallic plate 3 may be adhesively joined to the top surface 12, side surfaces 13 and bottom surface 12 of the core plate 1 respectively. However, this is not restrictive, and they may be merely brought into intimate contact with each other. Also, when the top surface metallic plate 2 is fitted over the core plate 1, the peripheral surface portions 23 may be first bent and adhesively joined to the respective side surfaces 13 after the surface portion 12 is adhesively joined to the top surface 11 of the core plate 1.

Figure 6A:
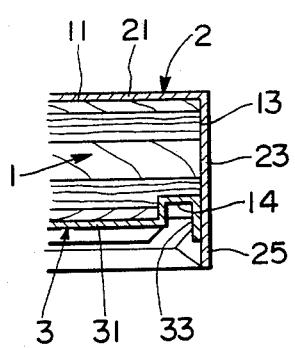
FIGS. 6(a) to 6(c) are fragmentary sectional views of the composite plate comprising the first embodiment, showing the manner in which the two metallic plates are folded together at their end portions into interlocking relation to provide an airtight seal to the core plate.
Figure 6B:
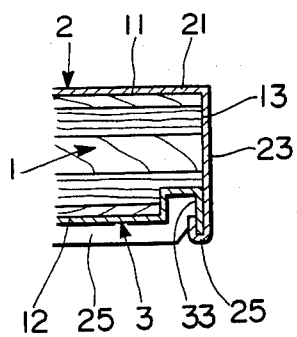
Figure 6C:
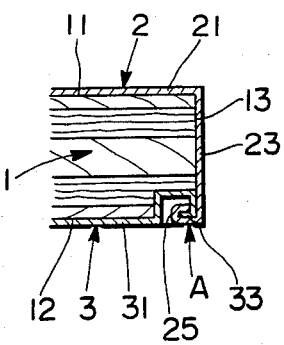

After the surfaces 11, 12 and 13 of the core plate 1 are enclosed by the two metallic plates 2 and 3, forward end portions of the joint portions 25 and 33 of the two metallic plates 2 and 3 respectively are bent inwardly and folded together, as shown in FIGS. 6(a), 6(b) and 6(c), in interlocking relation to provide joints A. (See FIG. 6(c)) formed of silicone rubber, butyl rubber or a soft plastic material is provided in each joint A to provide a seal therein. By cutting the side edges 26 and 34 of the joint portions 25 and 33 as shown in FIGS. 2 and 3 respectively, the joint portions 25 and 33 are prevented from interfering with each other at four corners when their forward end portions are inwardly bent and folded together as described hereinabove.

Figure 8:
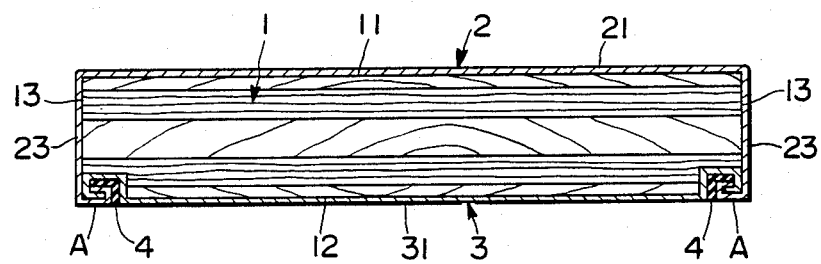
FIG. 8 is a sectional view of the composite plate provided as an end product.
Figure 7:
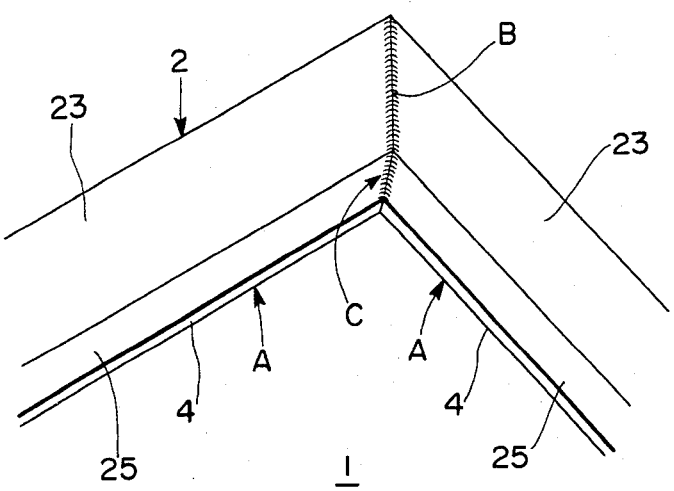
FIG. 7 is a fragmentary perspective view of the composite plate comprising the first embodiment, showing a corner portion of the composite plate provided as an end product.

Thereafter, as shown in FIG. 7, edges B of the peripheral surface portions 23 in abutting engagement with each other and the joints A formed by the joint portions 25 and 33 are joined together by welding, to thereby provide a composite plate according to the invention by airtightly sealing the core plate 1 as shown in FIG. 8.

In the first embodiment shown and described hereinabove, the welding of the edges B of the peripheral surface portions 23 of the top surface metallic plate 2 may be performed before the top surface metallic plate 2 are fitted over the core plate 1. The seal 4 applied to each joint A may be dispensed with, and the joint portions 25 contiguous with the peripheral surface portions 23 of the top surface metallic plate 2 and the joint portions 33 contiguous with the surface portion 31 of the bottom surface metallic plate 3 may be joined together as by seam welding or spot welding before the welds are inwardly bent and folded together in interlocking relation.

Figure 9:
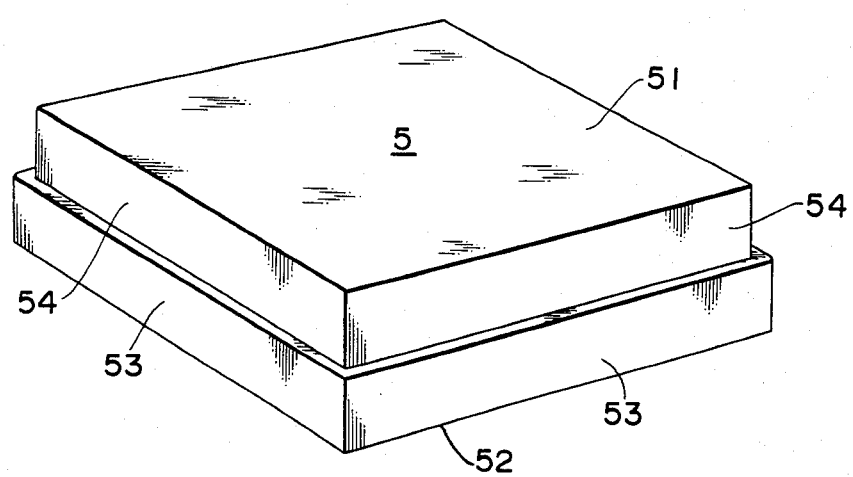
FIG. 9 is a perspective view of the wooden core plate of the composite plate comprising a second embodiment.

FIGS. 9–15 show a second embodiment of the composite plate in conformity with the invention in which FIG. 9 is a perspective view of a core plate 5 which is formed of plywood and includes a top surface 51 and a bottom surface 52 which are both flat. The core plate 5 also has four side surfaces which are each stepped at the middle to provide a lower side surface 53 and an upper side surface 54. The upper side surfaces 54 are provided to obtain smoothness in the peripheral surface of the composite plate according to the invention.

Figure 10:
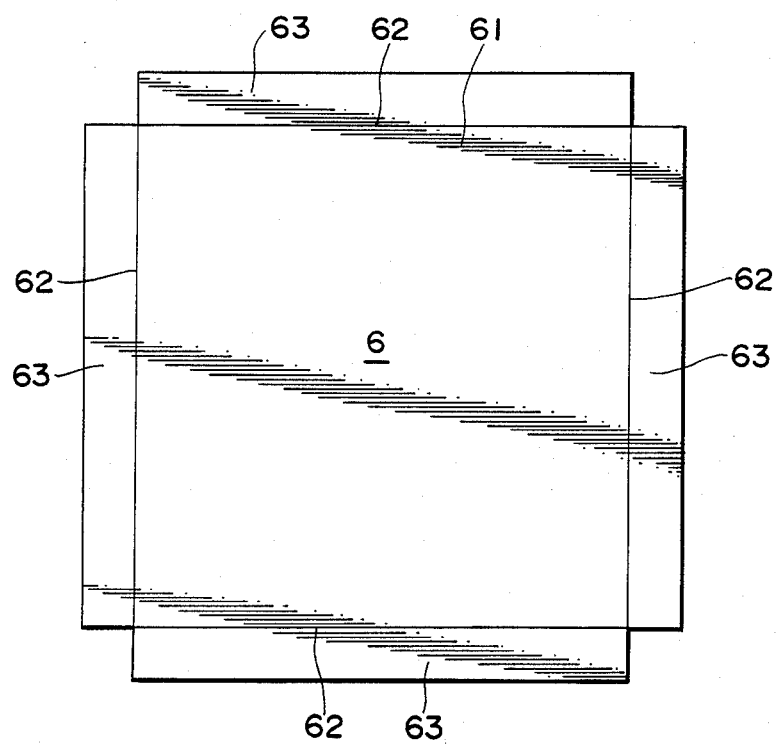
FIG. 10 is a developed view of the top surface metallic plate of the composite plate comprising the second embodiment.

FIG. 10 is a developed view of a top surface metallic plate 6 which is formed of stainless steel and integrally includes a surface portion 61 corresponding to the top surface 52 of the core plate 5, and joint portions 3 contiguous with the surface portion 61 through folds 62 which correspond to the respective upper side surface portions 54 of the core plate 5.

Figure 11:
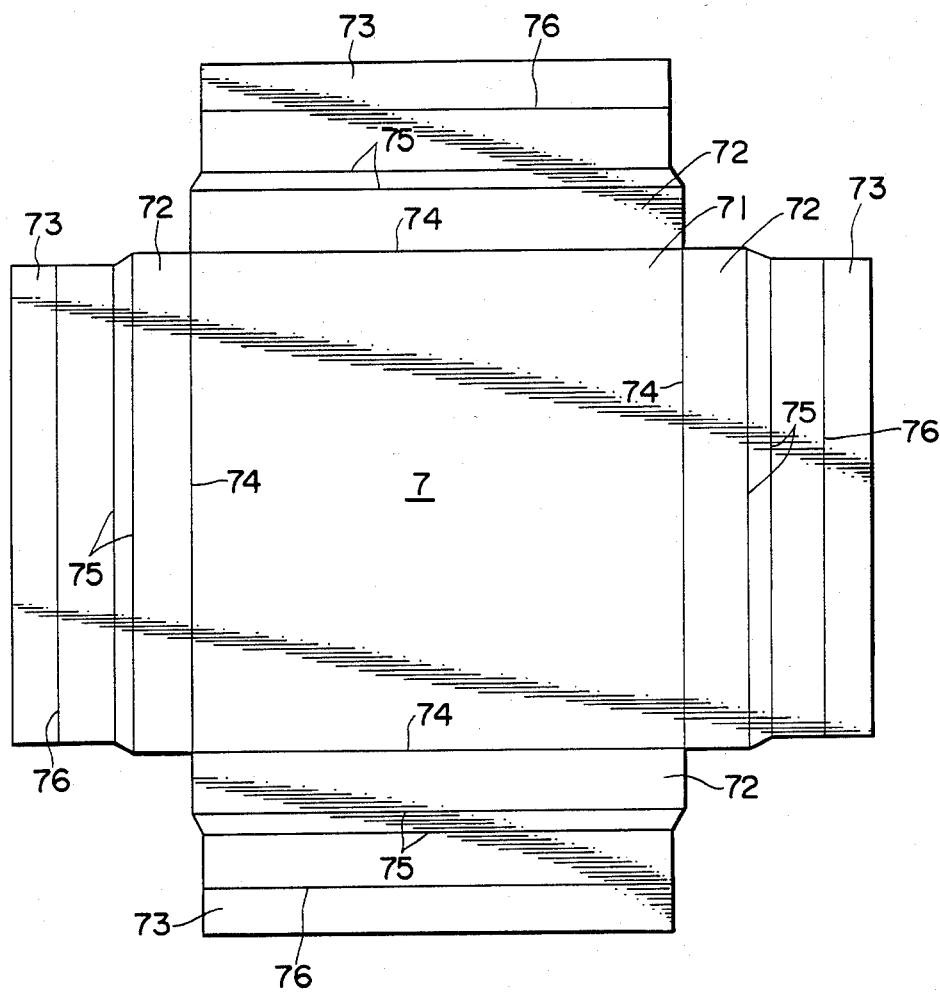
FIG. 11 is a developed view of the bottom surface metallic plate of the composite plate comprising the second embodiment.

FIG. 11 is a developed view of a bottom surface metallic plate 7 which is formed of stainless steel and integrally includes a surface portion 71 corresponding to the bottom surface 52 of the core plate 5, peripheral surface portions 72 conforming to the respective lower side surfaces 53 and upper side surface of the core plate 5, and joint portions 73 corresponding to the respective joint portions 63 of the top surface metallic plate 6. The peripheral surface portions 72 are contiguous with the surface portion 71 through folds 74 and each have two folds 75 which divide the peripheral surface portion 72 into two portions corresponding to the lower side surface 53 and upper side surface 54 of the core plate 5. The joint portions 73 are contiguous with the respective peripheral surface portions 72 through folds 76.

In the second embodiment shown and described hereinabove, the top surface and bottom surface metallic plates 6 and 7 are fitted over the core plate 5 as shown in FIGS. 12–15 to provide an airtight seal to the core plate 5.

Figure 12:
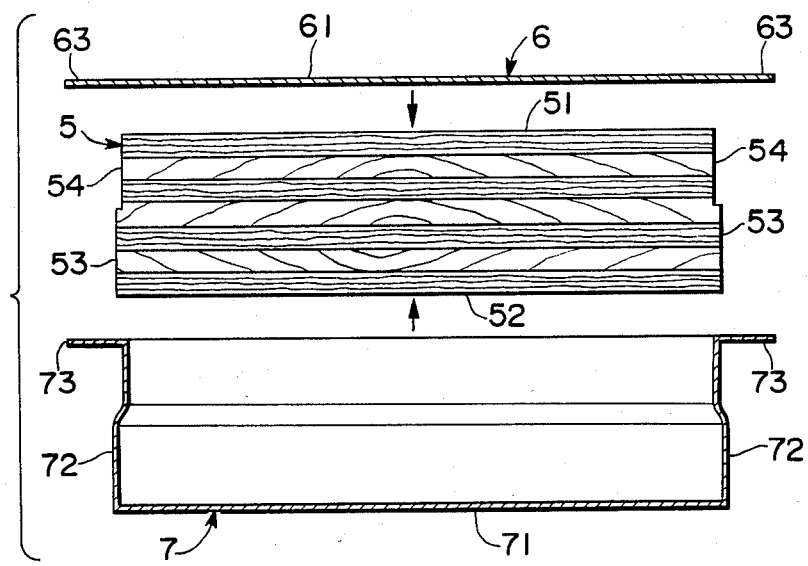
FIG. 12 is a sectional view of the wooden core plate and the top surface and bottom surface metallic plates of the composite plate comprising the second embodiment, before the wooden core plate is enclosed by the two metallic plates.

More specifically, as shown in FIG. 12, the peripheral surface portions 72 of the bottom surface metallic plate 7 are bent upwardly to a vertical position in which they are at right angles to the surface portion 71 and then further bent to conform to the upper side surfaces 54 of the core plate 5. Then, the joint portions 73 are bent outwardly at right angles to the respective peripheral surface portions 72 into a horizontal position. Thus the bottom surface metallic plate 7 are formed into a box shape.

Figure 13:
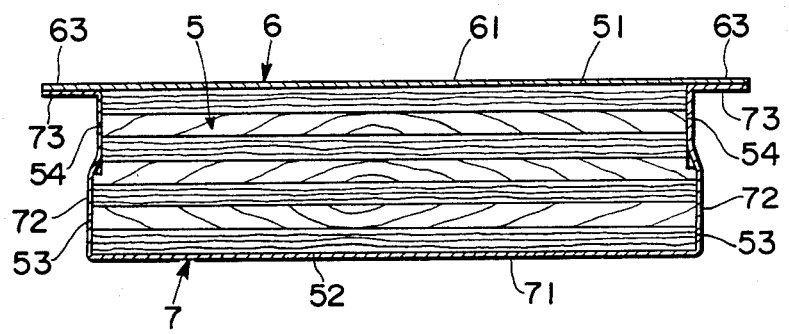
FIG. 13 is a sectional view of the composite plate comprising the second embodiment, showing the wooden core plate enclosed by the two metallic plates.
Figure 15:
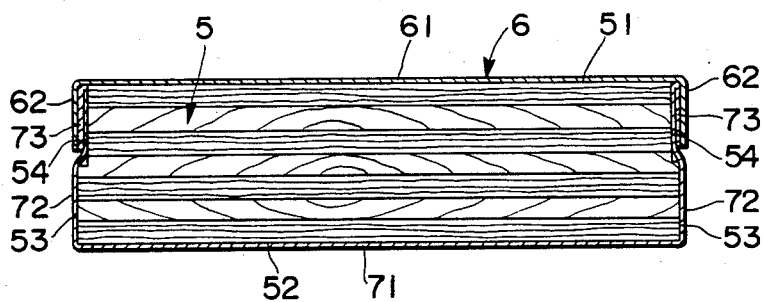
FIG. 15 is a sectional view of the composite plate provided as an end product.

Then, as shown in FIG. 13, the bottom surface metallic plate 7 now in the form of a box is fitted to the core plate 5, and the surface portion 71 is adhesively attached to the bottom surface 52 of the core plate 5 while the peripheral surface portions 72 are adhesively attached to the lower side surfaces 53. By adhesively attaching the surface portion 61 of the top surface metallic plate 6 to the top surface 51 of the core plate 5, the top and bottom surfaces 51 and 52 and lower and upper side surfaces 53 and 54 are enclosed by the top and bottom surface metallic plates 6 and 7.

Figure 14A:
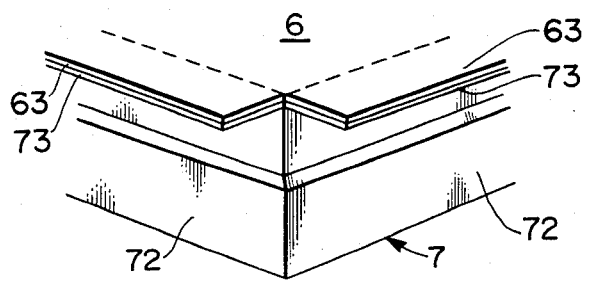
FIGS. 14(a)–14(c) are fragmentary perspective views of the composite plate comprising the second embodiment, showing the manner in which the metallic plates are joined together and welded at one corner.
Figure 14B:
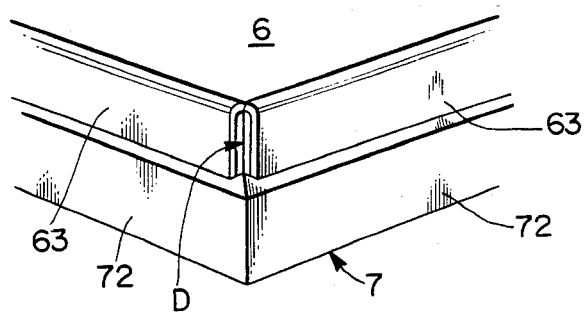
Figure 14C:
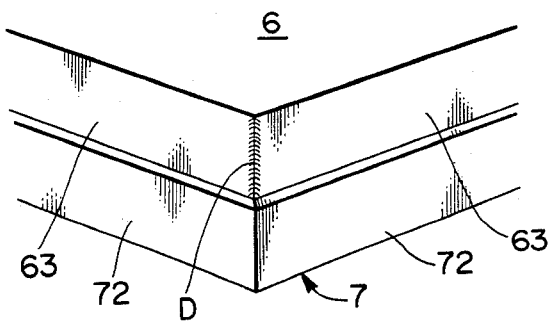

Thereafter, as shown in FIGS. 14(a) and 14(b), the joint portions 63 and 73 of the top and bottom surface metallic plates 6 and 7 respectively are superposed one over the other and joined together by welding, and the joint portions 63 and 73 thus joined together are bent downwardly into contact with the respective upper side surfaces 54 of the core plate 5, before side edges of the joint portions 63 and 73 and the peripheral surface portions 72 in abutting engagement are joined together by welding as indicated at D as shown in FIG. 14(c). Thus, the core plate 5 is completely sealed by the surface portions 61 and 71 of the top and bottom surface metallic plates 6 and 7 respectively and the peripheral surface portions 72 of the bottom surface metallic plate 7.

In the second embodiment shown and described hereinabove, the joint portions 63 located at the outer periphery of the top surface metallic plate 6 and the joint portions 73 at the forward ends of the peripheral surface portions 72 of the bottom surface metallic plate 7 are joined together by welding and the joint portions 63 and 73 thus welded together are bent into contact with the respective upper side surfaces 54 of the core plate 5. This makes it possible to do without the seal 4 used with the first embodiment shown in FIGS. 1–8 without impairing airtightness of the seal provided to the core plate 5, and to obtain flatness at both top and bottom surfaces. The composite plate constructed as aforesaid has no joints on their flat surfaces, so that the top and bottom surface can both be used effectively, thereby enhancing the versatility of the composite plate.

In each of the embodiments shown and described hereinabove, the metallic plates 2, 6 and 3, 7 for sealing the core plate 1, 5 have been described as being formed of stainless steel. However, this is not restrictive and a plate of any suitable metal, such as aluminum alloy, may be used. A flame-proof and non-smoke-producing plywood is advantageously used for forming the core plate 1, 5 by taking into consideration the case of welding together the corners of the composite plate. However, ordinary plywood may be used instead, and any other wooden plate, such as a plate formed of fiberboard or particleboard, may be used without departing from the scope of the invention.

The composite plate according to the invention has been shown as being square in shape. However, this is not restrictive and the composite plate may be of any shape as desired, such as rectangular or polygonal shape. Also, in each of the embodiments shown and described hereinabove, the composite plate itself is substantially in the form of a cube when the core plate is sealed by the top and bottom surface metallic plates. However, this is not restrictive, and two types of composite plates may be provided with one type having a stepped portion at some of the side surfaces of the composite plates in a position close to the top surface and the other type having a stepped portion at some of the side surfaces of the composite plates in a position close to the bottom surface. Thus, when it is desired to arrange a multiplicity of composite plates in rows and columns to cover the floor of a vehicle, for example, the composite plates can be connected together by bringing the stepped portions located in a position close to the top surface in engagement with the stepped portions located in a position close to the bottom surface.

The composite plate according to the invention has particular utility for use as wall plates, floor plates, ceiling plates and other structural plates for the subway cars and other means of transportation.

What is claimed is:

1. A relatively light-weight structural member resistant to fire, generation of smoke and impervious to moisture comprising:
    a substantially flat wood core defined by a top surface, a bottom surface and side surfaces;
    top and bottom metallic plates covering said top and bottom surfaces of said wood core and metallic sides integral with said top and bottom plates covering said side surfaces of said wood core;
    said top and bottom metallic plates being provided with integral overlapping-sealed joint portions to seal said metallic plates about said wood core; the overlapping parts of said joint portions being bent towards said wood core to form edges which abut one another, said edges being welded together to form a complete seal about said wood core.

2. A structural member according to claim 1, wherein said wood core is provided with a stepped portion at its outer periphery and said metallic plates are joined together at said stepped portion by bending said overlapping joint portions into said stepped portion.

3. A structural member according to claim 2, wherein said metal plates are formed of stainless steel.

4. A structural member according to claim 1, wherein said wood core is formed of plywood.

* * * * *